(12) United States Patent
Giese et al.

(10) Patent No.: US 9,797,416 B2
(45) Date of Patent: Oct. 24, 2017

(54) MASTER BRAKE CYLINDER ARRANGEMENT WITH ACTUATION DETECTION FOR A VEHICLE BRAKE SYSTEM

(71) Applicant: Lucas Automotive GmbH, Koblenz (DE)

(72) Inventors: Hans-Martin Giese, Polch (DE); Torsten Petry, Koblenz (DE); David Lopez-Larequi, Koblenz (DE)

(73) Assignee: LUCAS AUTOMOTIVE GMBH, Koblenz (DE)

( * ) Notice: Subject to any disclaimer, the term of this patent is extended or adjusted under 35 U.S.C. 154(b) by 378 days.

(21) Appl. No.: 14/079,667

(22) Filed: Nov. 14, 2013

(65) Prior Publication Data
US 2014/0137550 A1   May 22, 2014

(30) Foreign Application Priority Data
Nov. 16, 2012  (DE) .......................... 10 2012 022 520

(51) Int. Cl.
*F15B 15/28*  (2006.01)
*B60T 17/22*  (2006.01)
(Continued)

(52) U.S. Cl.
CPC .............. *F15B 15/28* (2013.01); *B60T 7/042* (2013.01); *B60T 11/20* (2013.01); *B60T 17/22* (2013.01);
(Continued)

(58) Field of Classification Search
CPC .......... B60T 7/042; B60T 11/20; B60T 17/22; F15B 15/28; F15B 15/2815;
(Continued)

(56) References Cited
U.S. PATENT DOCUMENTS

| 6,886,333 B2 * | 5/2005 | Feigel ..................... B60T 7/042 60/534 |
| 7,318,313 B2 | 1/2008 | Lavezzi et al. |

(Continued)

FOREIGN PATENT DOCUMENTS

| DE | 19915832 A1 | 7/2000 |
| DE | 10053995 A1 | 5/2002 |

(Continued)

*Primary Examiner* — Logan Kraft
(74) *Attorney, Agent, or Firm* — MacMillan, Sobanski & Todd, LLC

(57) ABSTRACT

A master brake cylinder arrangement includes at least one piston arrangement with a piston movably guided in a receiving bore in a master brake cylinder housing. The piston, together with the receiving bore, delimits a pressure chamber which is in fluid connection with a hydraulic brake circuit and may be moved along a movement axis between an initial position and an actuation position. A position detecting device detects movement of the piston caused by actuation is provided within the receiving bore. The position detecting device has a sensor element, which is movable as a function of a piston movement, and a position detecting sensor, which is arranged fixed on the master brake cylinder housing. The sensor element is received and guided in the master brake cylinder housing independently of the piston and is capable of interacting with the piston for deflection as a function of the piston movement.

19 Claims, 6 Drawing Sheets

(51) Int. Cl.
*B60T 7/04* (2006.01)
*B60T 11/20* (2006.01)

(52) U.S. Cl.
CPC ...... *F15B 15/2861* (2013.01); *F15B 15/2892* (2013.01); *F16D 2500/31426* (2013.01)

(58) Field of Classification Search
CPC .............. F15B 15/2861; F15B 15/2892; F15B 15/2807; F16D 2500/3101; F16D 2500/31426
USPC .................................... 60/534; 91/1; 92/5 R
See application file for complete search history.

(56) References Cited

U.S. PATENT DOCUMENTS

| | | | | |
|---|---|---|---|---|
| 2007/0182403 | A1* | 8/2007 | von Hayn | B60T 7/042 324/207.24 |
| 2007/0186767 | A1* | 8/2007 | Staudinger | F15B 15/2807 92/5 R |
| 2013/0205881 | A1 | 8/2013 | Naether et al. | |

FOREIGN PATENT DOCUMENTS

| | | |
|---|---|---|
| DE | 10242266 A1 | 3/2004 |
| DE | 10356299 A1 | 7/2004 |
| DE | 102004014808 A1 | 11/2004 |
| DE | 102010027308 A1 | 1/2012 |
| EP | 1588390 A1 | 10/2005 |

\* cited by examiner

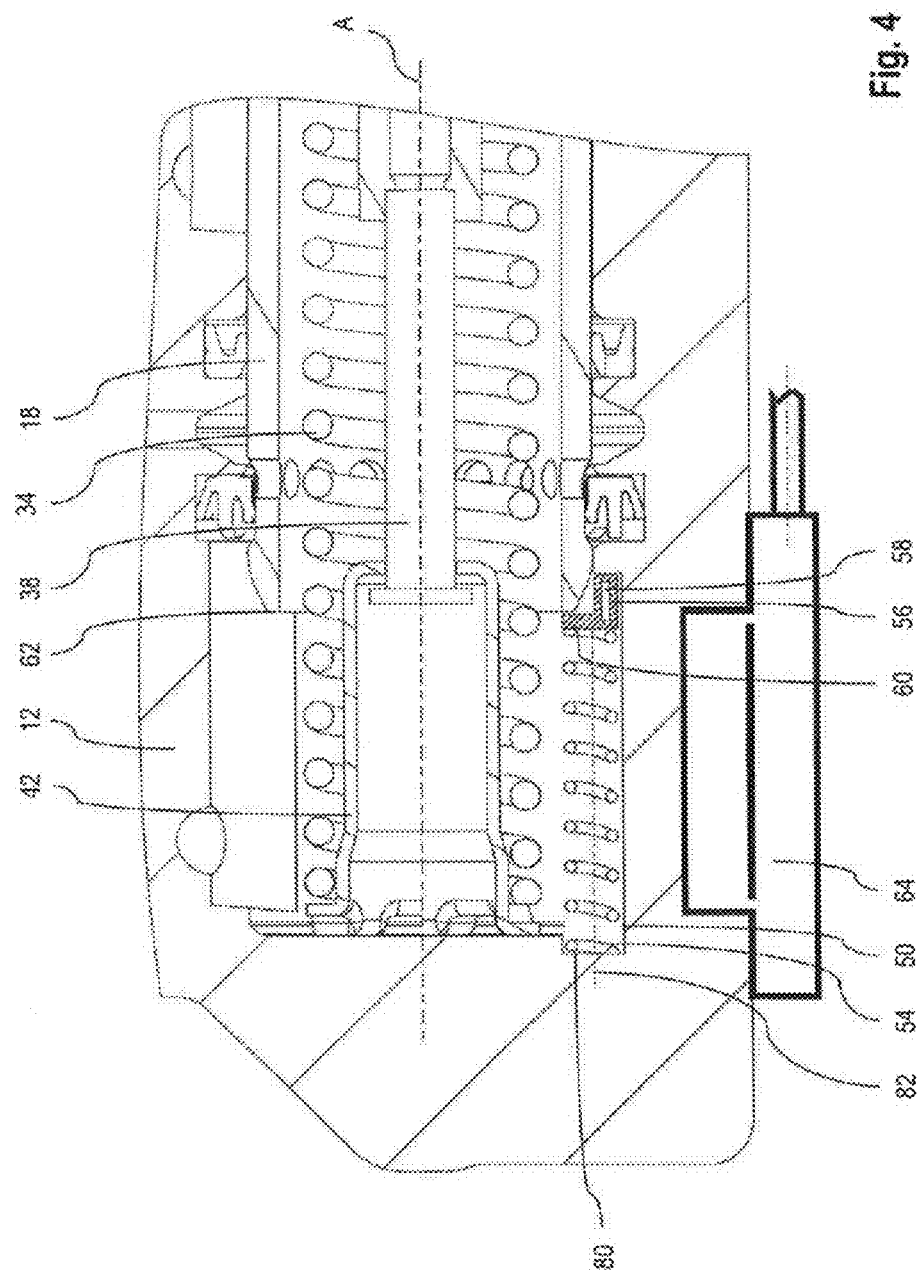

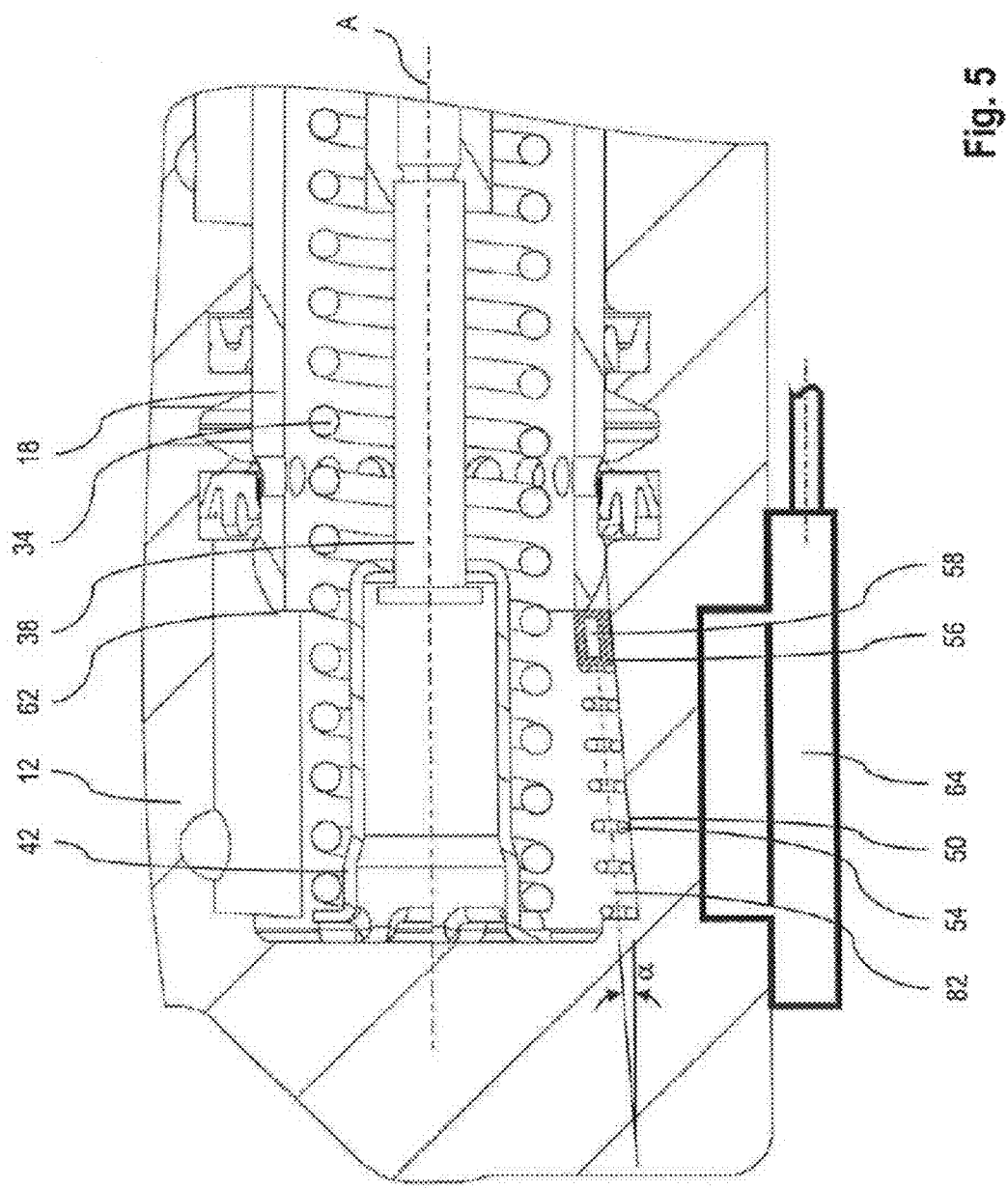

MASTER BRAKE CYLINDER ARRANGEMENT WITH ACTUATION DETECTION FOR A VEHICLE BRAKE SYSTEM

BACKGROUND OF THE INVENTION

The present invention relates to a master brake cylinder arrangement with actuation detection for a vehicle brake system, including at least one piston arrangement with a piston which is movably guided in a receiving bore in a master brake cylinder housing, wherein the piston, together with the receiving bore, delimits a pressure chamber which is in fluid connection with a hydraulic brake circuit and may be moved along a movement axis between an initial position and an actuation position, wherein a position detecting device for detecting movement of the piston which is caused by actuation is provided within the receiving bore, and wherein the position detecting device has a sensor element, which is movable as a function of a piston movement, and a position detecting sensor, which is arranged fixed on the master brake cylinder housing.

Master brake cylinder arrangements of this kind are known from the prior art. For example, DE 199 15 832 A1 discloses a master brake cylinder arrangement in which the piston is provided with a ring magnet and in which a position detecting sensor is arranged on the master brake cylinder housing. Although this arrangement is widely used in practice and functions reliably, it has the disadvantage that the individual components for detecting position are arranged such that they engage directly in the structure of the master brake cylinder arrangement, in particular in the piston.

Similar arrangements are known from DE 10 2004 014 808 A1, DE 103 56 299 A1, DE 100 53 995 A1, and DE 102 42 266 A1.

Furthermore, EP 1 588 390 B1 discloses a master brake cylinder arrangement in which there is integrated an electric switch which closes an electrical circuit following actuation of the piston. As a result, binary position detection is, so to speak, possible, depending on the current switch position of the electric switch.

SUMMARY OF THE INVENTION

The object of the present invention is to provide a master brake cylinder arrangement of the type indicated at the outset which provides the possibility of detecting position in a simple and compact construction, without the need to take measures directly at the piston.

This object is achieved by a master brake cylinder arrangement of the type indicated at the outset in which it is provided for the sensor element to be received and guided in the master brake cylinder housing independently of the piston and to be capable of interacting with the piston, for deflection as a function of the piston movement.

According to the invention, it is possible for the individual components for position detection of the current position of the piston to be constructed independently of the piston. This makes manufacture simpler because the piston does not have to be additionally modified. In addition, it makes assembly simpler and ensures reliable functioning. Using the present invention, it is also possible for a sensor to detect only partial regions of the piston movement, which overall results in a more compact construction of the master brake cylinder arrangement. The sensor element may for example take the form of a simple magnet. It is also possible for the position detecting device to take the form of a Hall effect sensor.

According to the invention, it may be provided for the sensor element to be received in a guide body which is guided in the master brake cylinder housing. This makes it possible to encapsulate and accordingly to protect the sensor element. Furthermore, the sensor element may accordingly be constructed in a standard geometric shape, for example a small cube or rectangular solid, wherein any functional faces or geometries may be constructed on the guide body. The guide body may for example be formed by a plastics part in which the sensor element is embedded.

A further development of the invention provides for the guide body to have an abutment portion by way of which it may interact with the piston. For example, it is possible to construct the abutment portion such that it abuts permanently against the piston or only abuts against it once a certain minimum travel of the piston has been passed. The abutment portion may for example take the form of a projection or finger. However, the abutment portion may also take the form of a functional face, for example a chamfered slide face which, as a function of the piston movement, results in a desired deflection of the guide body together with the sensor element.

An alternative further development of the invention provides a deflection lever for deflection of the sensor element as a function of the piston movement. In this arrangement, the deflection lever may be coupled to the master brake cylinder housing in articulated manner and be capable of interacting with the piston. If the piston is deflected, the deflection lever acts, so to speak, as a transmission member between the piston and the sensor element. The coupling to the master brake cylinder housing may, for example, be made by way of a flexible adhesive point or similar.

It may furthermore be provided according to the invention for the sensor element to be capable of deflection substantially parallel, obliquely, or substantially at a right angle to the movement axis. The position detecting sensor is to be arranged in dependence on the alignment of the direction of movement of the sensor element as a consequence of a piston movement. This makes it possible to construct the master brake cylinder arrangement according to the invention variably in dependence on the spatial conditions of a vehicle in which it is to be installed.

In this connection, it may be provided for the sensor element or the guide body carrying it to have a ramped face which has the effect of moving the sensor element in relation to the master brake cylinder housing when the piston is actuated. The ramped face is constructed such that the possibility of the piston or the piston movement being blocked is ruled out. Where appropriate, a contact face on the piston may be constructed to have a corresponding chamfer and interact with the ramped face in the event of piston movement, such that the two oblique faces can slide on one another reliably and with the desired interaction.

According to the invention, it may furthermore be provided for the sensor element to be pre-tensioned in its initial position in the master brake cylinder housing by a spring arrangement and to be movable with the piston from an initial position into an actuation position, deflecting the spring arrangement. Here, it is possible for the spring arrangement to be a compression spring, a tension spring, a deformable elastomeric body, or similar. In this connection, a variant embodiment provides for the spring arrangement to be compressible substantially parallel to the movement axis. This is the case if the sensor element is moved substantially parallel to the movement axis as a function of the piston movement. As an alternative to this, however, it is also possible for the spring arrangement to be compressible obliquely or transversely to the movement axis. As already stated above, this may be advantageous if it is important to construct the master brake cylinder arrangement as a function of the spatial conditions in the vehicle in which it is to be installed. Furthermore, in connection with the pre-tension of the sensor element, it is possible for the spring arrangement to be already pre-tensioned in the initial position of the sensor element. For example, a captured spring arrangement may be used. It is also possible to construct the spring arrangement to be encapsulated, for example, in a type of cartridge, sleeve, or similar.

According to the invention, it may furthermore be provided for the master brake cylinder housing to have a guide recess in which the guide body and/or the spring arrangement is received. The guide recess may for example take the form of a groove, a slot-like depression, or a bore. Depending on the desired shape and arrangement of the position detecting sensor, it may extend parallel, obliquely, or substantially at a right angle to the movement axis.

In an alternative embodiment of the master brake cylinder arrangement of the type described at the outset, it may be provided for the sensor element to have a body of ferromagnetic material which, as seen in the section including the movement axis, is U-shaped and is coupled or couplable to the piston and whereof the longitudinal limbs point towards the position detecting sensor and whereof the transverse limb extends substantially parallel to the movement axis, wherein there is associated with the position detecting sensor in a fixed position a magnet, wherein the position detecting sensor is constructed, as a function of the relative position of the longitudinal limbs in relation to the position detecting sensor and to the fixed magnet, to detect the current piston position. This has the advantage that the magnet need not be mounted directly on the piston but that only a ferromagnetic portion or a separate ferromagnetic component can be provided, as a sensor element, on the piston. The magnetic field extends from the magnet, which is associated in fixed manner with the position detecting sensor and whereof the magnetic field varies as a function of the movement of the ferromagnetic component or portion when the piston moves in the event of brake actuation. This variation in the magnetic field can then be detected by way of the position detecting sensor.

In all the embodiments of the master brake cylinder arrangement according to the invention, it may be provided for the position detecting device to provide the position signal that characterizes the current piston position, wherein this position signal may be used to actuate a brake light display and as an input signal for a brake assist system, vehicle stabilization system or similar.

BRIEF DESCRIPTION OF THE DRAWINGS

The invention is explained by way of example with reference to the attached figures, in which:

FIG. 4 shows a partial sectional view, including the axis, of a master brake cylinder arrangement according to a third embodiment of the invention, in the initial position;

FIG. 5 shows a partial sectional view, including the axis, of a master brake cylinder arrangement according to a fourth embodiment of the invention, in the initial position;

DETAILED DESCRIPTION OF THE PREFERRED EMBODIMENT

Figure 1:
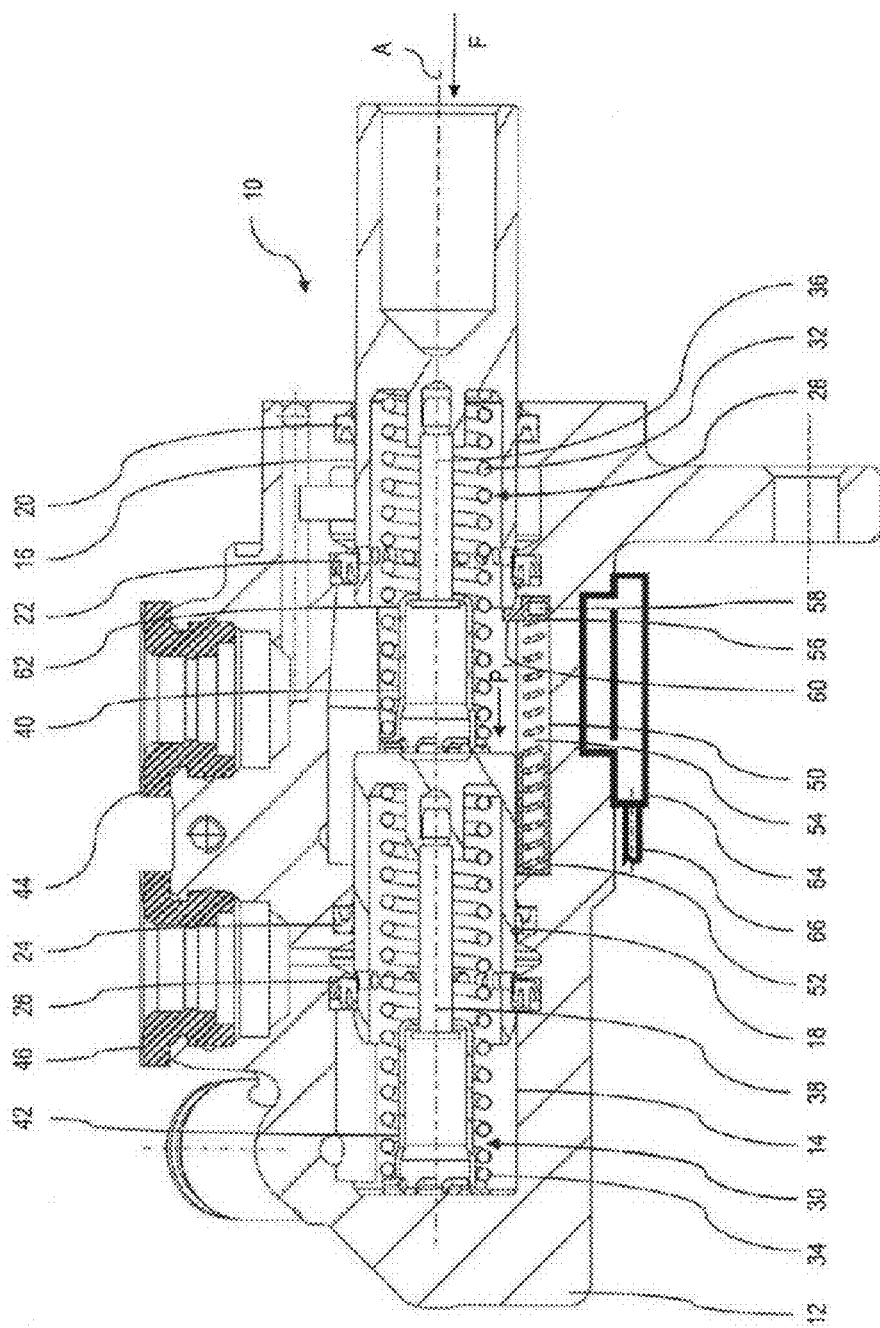
FIG. 1 shows a sectional view, including the axis, of a master brake cylinder arrangement according to a first embodiment of the invention.

In FIG. 1, a master brake cylinder arrangement according to the invention is shown in a sectional view that includes the movement axis A and is overall designated 10. The master brake cylinder arrangement 10 includes a master brake cylinder housing 12 which is constructed to have a cylindrical receiving bore 14 running in the direction of the movement axis A. A first piston 16 and a second piston 18 are guided movably in the receiving bore 14. The pistons 16, 18 are sealed at their outer peripheral face by way of appropriate seals 20, 22, 24, 26. The seals 20-26 are received in corresponding recesses in the master brake cylinder housing 12.

The two pistons 16, 18 are pre-tensioned into the initial position, shown in FIG. 1, by way of restoring spring arrangements 28, 30. Both the restoring spring arrangements 28, 30 are so-called captured spring arrangements in which the respective pressure spring 32, 34 is pre-tensioned by way of a clamping pin 36, 38 and a clamping sleeve 40, 42. Here, the clamping pin 36 or 38 is fixed to the respective piston 16, 18 at its one end and holds the clamping sleeve 40, 42 respectively associated therewith at its other end by way of a flange. The arrangement shown in FIG. 1 is known as a tandem piston arrangement. It can furthermore be seen from FIG. 1 that sealing elements 44, 46 for connecting a fluid container (not shown) for brake fluid are provided in the master brake cylinder housing 12.

The arrangement for detecting the position of the first piston 16 will be discussed below.

In the master brake cylinder housing 12, there is provided an elongate recess 50 extending in the direction of the movement axis A. This recess receives a helical pressure spring 54 which is under pre-tension and is received in a sleeve 52. Shown at the right-hand end of the helical pressure spring 54, as seen in FIG. 1, is a guide body 56 in which there is integrally formed a sensor element 58. The guide body 56 is guided in the recess 50 movably in the direction of the movement axis A. It has a finger 60 that projects into the interior of the receiving bore 14. The finger 60 projects far enough into the interior of the receiving bore 14 to abut against an end face 62 of the first piston 16 in the initial position, shown in FIG. 1. It can furthermore be seen that a position sensor, in particular a Hall effect sensor, 64 is mounted on the outer region of the master brake cylinder housing 12 and can be connected to the onboard electronics of a vehicle by way of a connecting cable 66. The position sensor 64 is constructed to detect the current position of the sensor element 58.

When the piston 16 is deflected as a result of brake actuation as a function of the force F in the direction of the movement axis A, the finger 60 abutting against the end face 62, together with the guide body 56, is deflected in accordance with the arrow $P_1$, and this compresses the helical pressure spring 54. The guide body 56 is moved in the recess 50 as a function of the movement of the piston 16. This movement is detected by way of the position sensor 64 and used to actuate brake lights and to perform control engineering measures within the vehicle, in particular control of brake regulating systems, driver assist systems, etc. When the piston 16 is released, that is to say when brake actuation comes to an end, the piston 16 moves back into its initial position, shown in FIG. 1, as a result of the action of the restoring springs 30, 34. The guide body 56 together with its sensor element 58 is moved back into its initial position, shown in FIG. 1, by the restoring movement of the compressed spring 54. This restoring movement is also detected by the position sensor 64 and interpreted appropriately in the vehicle.

The particular feature of the construction of this embodiment lies in the fact that no special measures have to be taken at the piston 16 for position detection. The master brake cylinder housing 12 can be provided with a position detecting device which is constructed in a manner independent of the piston 16, so to speak. This makes it possible to ensure that piston-related tolerances do not affect position detection. Moreover, assembly is simplified by the solution shown in FIG. 1.

Figure 2:
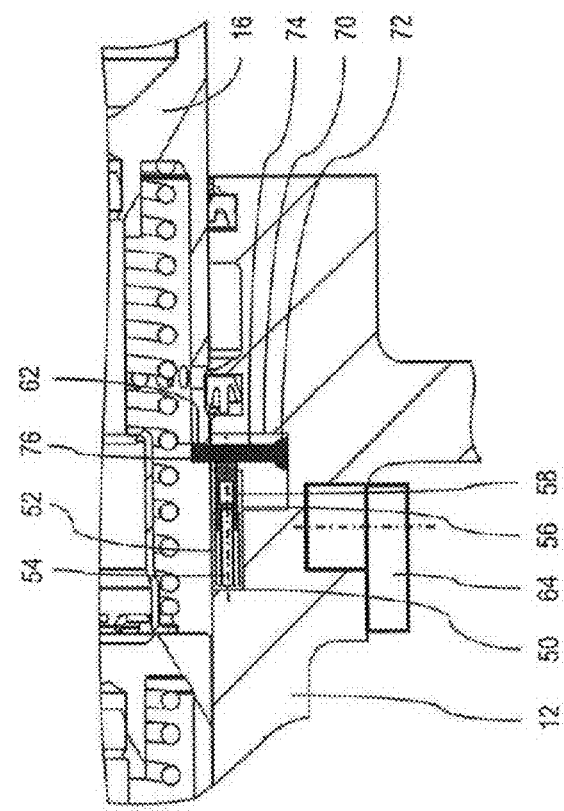
FIG. 2 shows a partial sectional view, including the axis, of a master brake cylinder arrangement according to a second embodiment of the invention, in the initial position.

FIG. 2 shows a second embodiment of the invention, wherein the basic construction of the master brake cylinder arrangement is substantially identical to that of the first embodiment and will not be described further here. To avoid repetition, the same reference numerals as before will thus be used for equivalent or similar components.

Figure 3:
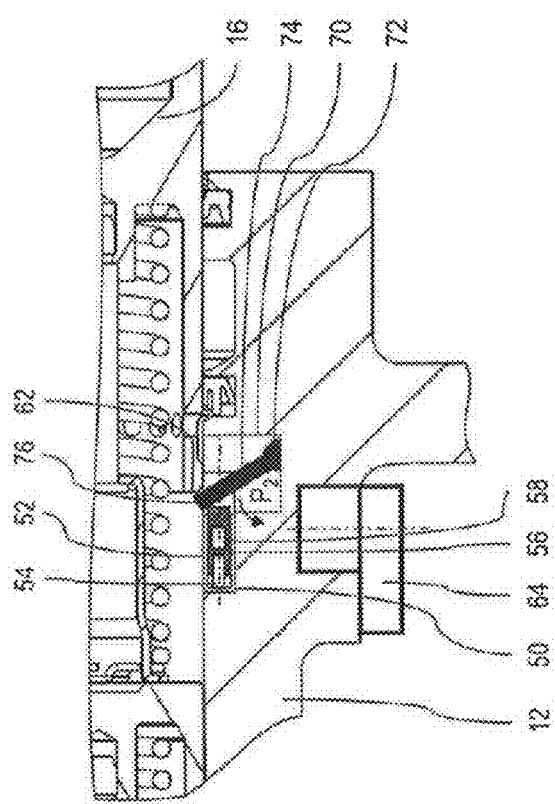
FIG. 3 shows a partial sectional view, including the axis, of the master brake cylinder arrangement according to the second embodiment of the invention, in an actuation position.

The second embodiment according to FIGS. 2 and 3 shows that the recess 50 in the master brake cylinder housing 12 is constructed to be stepped, a deflection lever 74 that is mounted in articulated manner by way of an articulation device 72 being provided in a lower region 70 of the recess. The deflection lever 74 abuts by means of its free end 76 against the end face 62 of the piston 16 and is pre-tensioned in the initial position shown in FIG. 2 by way of the force of the (schematically indicated) pressure spring 54 and the guide body 56 coupled to the latter. Where appropriate, the articulation device 72 may also provide a pre-tensioning force. Once again, the sensor element 58 is embedded in the guide body 56. Following deflection by the piston 16 in the event of brake actuation, the deflection lever 74 is pivoted about the articulation device 72 in accordance with the arrow $P_2$ (see FIG. 3). During this, the spring 54 is compressed and the guide body 56 is deflected together with the sensor element 58. Once again provided is the position sensor 64 by means of which this deflection can be detected.

FIG. 4 shows a further embodiment of the invention which is similar to the first embodiment according to FIG. 1. Once again, to avoid repetition, the same reference numerals as before will be used for equivalent or similar components.

A particular feature of this embodiment lies in the fact that the position is detected at the piston 18, that is to say at the left-hand piston, as seen in FIG. 1, of the master brake cylinder arrangement 10. In the embodiment according to FIG. 4, furthermore, the recess 50 is somewhat flatter in construction. Accordingly, the guide body 56 with the sensor element 58 arranged therein is also of flatter construction. Once again, a finger 60 integrally formed on the guide body 56 cooperates with the end face 62 of the piston 18. In the embodiment shown, the pressure spring 54 is received in a slight depression 80 and its longitudinal axis 82 is aligned substantially parallel to the movement axis A. Functioning corresponds to the functioning described for the embodiment according to FIG. 1, but as regards deflection of the piston of 18, which is moved as a function of the deflection of the piston 16.

FIG. 5 shows a further embodiment of the invention which is similar to the embodiment according to FIG. 4. Once again, to avoid repetition, the same reference numerals as before will be used for equivalent or similar components.

In the embodiment according to FIG. 5, in which once again movement of the piston 18 is detected, the recess 50 in the master brake cylinder housing 12 extends not parallel to the movement axis A but obliquely, at an angle $\alpha$ of approximately 5°. Accordingly, the longitudinal axis 82 of the spring 54 also extends at the angle $\alpha$. Once again, the guide body 56 with its sensor element 58 abuts against the end face 62 of the piston 16, under pre-tension from the spring element 54. If, on actuation of the piston 16 and as a function of its movement, the piston 18 is moved, the guide body 56 is moved along the oblique axis 82. This movement is detected by way of the position sensor 64. The advantage of this oblique alignment of the direction of movement of the sensor element 58 lies in the fact that, as the sensor element 58 is moved further out of its initial position, it approaches the position sensor 64, making position detection even more precise.

Figure 6:
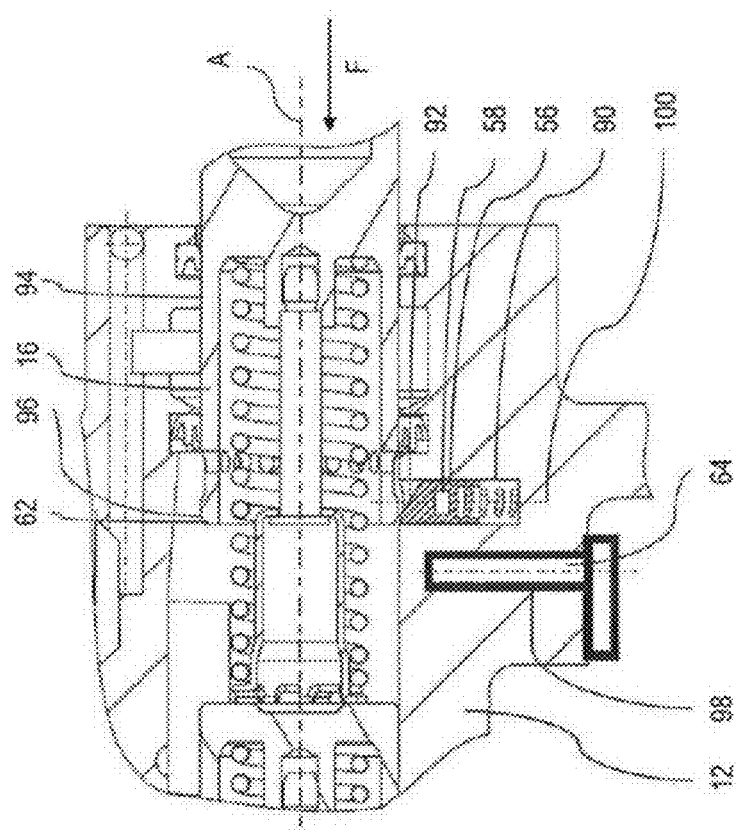
FIG. 6 shows a partial sectional view, including the axis, of a master brake cylinder arrangement according to a fifth embodiment of the invention, in the initial position.
Figure 7:
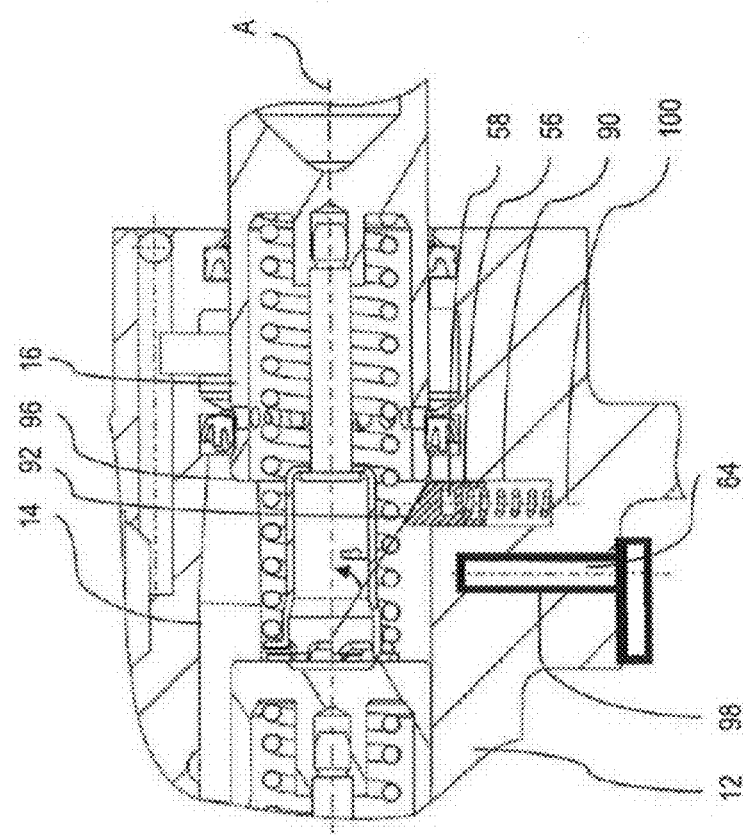
FIG. 7 shows a partial sectional view, including the axis, of the master brake cylinder arrangement according to the fifth embodiment of the invention, in an actuation position.

FIGS. 6 and 7 show a further embodiment of the invention, in which movement of the sensor element is at a right angle to the movement axis A. Provided in the master brake cylinder housing 12, extending from the receiving bore 14, is a transverse bore 90. Received in this transverse bore 90 is a pressure spring 54 which is supported against the base of the transverse bore 90 by its one end and is received in the guide body 56 at its other end. The guide body 56 again has a sensor element 58 embedded therein. The guide body 56 is of a geometric construction such that it is guided in the transverse bore 90 with a slight play. Suitable profiling of the transverse bore 90 or other measures prevent the guide body 56 from being rotated. At its upper end, as seen in FIGS. 6 and 7, the guide body 56 has an oblique face 92. The latter forms an angle $\beta$ of approximately 30° with the movement axis A. It is furthermore seen that a chamfer 96 is provided between the end face 62 of the piston 16 and its peripheral face 94. This chamfer 96 is at an angle complementary to the angle $\beta$.

FIGS. 6 and 7 show that a receiving bore 98 is further made in the master brake cylinder housing 12 from the outside and that the position sensor 64 is inserted into this substantially parallel to the longitudinal axis 100 of the transverse bore 90. Thus, in the event of movement of the guide body 56 with its sensor element 58 inside the transverse bore 90, the current position of the sensor element 58 can be detected by way of the position sensor 64.

FIG. 6 shows the initial position of the arrangement, that is to say the position with the piston 16 unactuated (not deflected). If the piston 16 is now deflected in accordance with the force F, it comes into contact, by means of its chamfer 96, with the oblique face 92 and pushes the guide body 56 into the master brake cylinder housing 12, in the direction of the longitudinal axis 100, substantially at a right angle to the movement axis A. This movement of the guide body 56 with its sensor element 58 is detected by way of the position sensor 64 and interpreted in the vehicle. When the piston 16 moves back into its initial position, the guide body 56 is moved back into its initial position in accordance with FIG. 6.

The embodiment shown in FIGS. 6 and 7 has the advantage that the position detecting arrangement can be arranged to save space.

Figure 8:
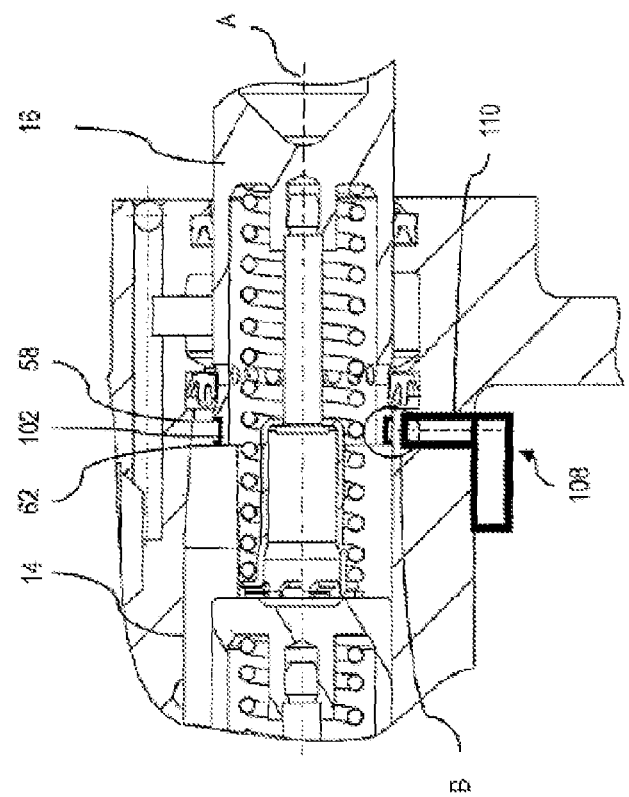
FIG. 8 shows a partial sectional view, including the axis, of the master brake cylinder arrangement according to a sixth embodiment of the invention, in an initial position.
Figure 9:
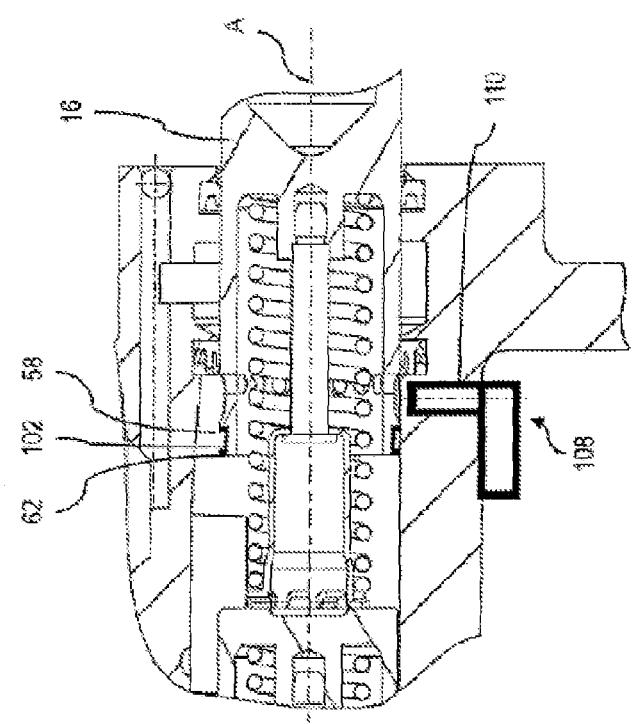
FIG. 9 shows a partial sectional view, including the axis, of the master brake cylinder arrangement according to the sixth embodiment of the invention, in an actuation position.
Figure 10:
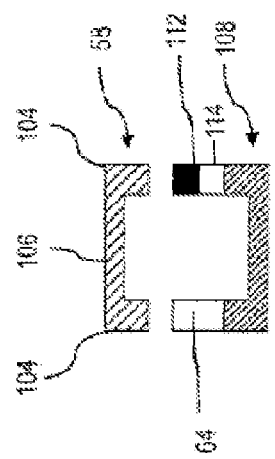
FIG. 10 shows a detailed illustration of the position detecting device according to the sixth embodiment of the invention.

FIGS. 8 to 10 show an alternative construction of the master brake cylinder arrangement of the type mentioned at the outset, wherein the basic construction of the master brake cylinder arrangement is substantially identical to that of the embodiments described above and will not be described further here. To avoid repetition, the same reference numerals as before will thus be used for equivalent or similar components.

In the embodiment shown in FIGS. 8 to 10, the sensor element 58 is permanently coupled to the piston 16. Here, the sensor element 58 is of annular construction and is arranged inside the receiving bore 14 such that the central axis of rotation of the sensor element 58 coincides with the movement axis A. The piston 16 is provided with a step in diameter 102 starting at its end face 62. The annular sensor element 58 may be pushed onto this step in diameter 102 accordingly.

As can be seen from FIG. 8, in the initial position of the piston 16 the sensor element 58 lies opposite, in a region B, a position detecting sensor unit 108 which is received in a receiver 110 in the master brake cylinder housing 12. Moreover, the sensor element 58 is constructed to have a U-shaped cross section, as seen in the section including the axis according to FIG. 8, whereof the transverse limb 106 extends substantially parallel to the movement axis A. The longitudinal limbs 104 point towards the position detecting sensor unit 108 in the region B. Here, the sensor element 58 is formed, at least in this region, by a ferromagnetic material.

FIG. 10 shows a partial section, including the movement axis A, through the sensor element 58 and the position detecting sensor unit 108 in the region B marked in FIG. 8. Here, only the essential and interacting constituents are shown and not, for example, the master brake cylinder housing 12 or any outer casing of the position detecting sensor unit 108. It is seen that the position detecting sensor unit 108 includes in its interior a position sensor 64, a magnet 112 and a connecting limb 114. Here, the position sensor 64 and the magnet 112 are respectively arranged at mutually opposing ends of the connecting limb, along the movement axis A. the position sensor 64 and the magnet 112 are thus arranged to be fixed in relation to one another.

As was the case in the exemplary embodiments above, here too the position sensor 64 is constructed to detect the current position of the sensor element 58, in particular in the event of movement of the piston 16 into or out of an actuation position shown according to FIG. 9. In this case, the position sensor 64 is constructed to detect properties of magnetic fields that are active in its environment. Here, it is primarily the magnetic field of the magnet 112 that is active. This interacts with the ferromagnetic material of the sensor element 58. Accordingly, a magnetic field is built up extending from the latter. This magnetic field, or all the magnetic fields occurring as part of the interaction of the sensor element 58 and the magnet 112, may be detected by the position sensor 64. If the sensor element 58 now moves as a function of a piston movement, there is also a relative movement between the magnet 112 and the position sensor 64, which are fixed in relation to one another and in relation to the master brake cylinder housing 12. The magnetic field extending from the sensor element 58 is also adapted accordingly. For example, if there is a change in the piston position from FIG. 8 to a position as shown in FIG. 9 the magnetic field is reduced, and during the reverse movement it is built up again. This is detectable by the position sensor 64 and can accordingly be supplied to the onboard electronics as a position signal of the piston 16.

An advantage of this variant lies in the fact that only a relatively small magnet 112 need be used, and this can be arranged independently of the piston. In the prior art set forth above, ring magnets are frequently provided, comparable to the annular sensor element 58. The size required for these to push against the piston 16 necessitates correspondingly higher material costs. Moreover, in order that the piston is secured non-detachably, it is frequently provided for the annular magnets to be pushed against the piston with press fit. However, permanent magnet materials are not necessarily ideally suited to this. Moreover, using the proposed arrangement, it is possible to restrict the extent to which the magnetic fields act as a whole on the direct environment of the position sensor 64, which can have a disruptive effect on other electrical components.

It is readily conceivable for one of the embodiments according to FIGS. 1-7 to be modified such that here too a ferromagnetic sensor element 64 and a position detecting sensor unit 108 according to FIGS. 8-10 are used.

What is claimed is:
1. A master brake cylinder arrangement with actuation detection for a vehicle brake system including at least one piston arrangement with a piston which is movably guided in a receiving bore in a master brake cylinder housing, wherein:
   the piston, together with the receiving bore, delimits a pressure chamber which is in fluid connection with a hydraulic brake circuit and may be moved along a movement axis between a piston initial position and a piston actuation position,
   a position detecting device, for detecting movement of the piston which is caused by actuation, is provided within the receiving bore,
   the position detecting device has a sensor element, which is movable by a piston movement, and a position detecting sensor, which is arranged fixed on the master brake cylinder housing,
   the sensor element is received and guided in the master brake cylinder housing independently of the piston and is capable of interacting with the piston for deflection as a function of the piston movement, the position detecting sensor being configured to detect a current position of the sensor element as it moves between a sensor element initial position and a sensor element actuation position with the piston, and
   one of either:
   (1) the sensor element, or a guide body carrying it, has a ramped face which has the effect of moving the sensor element in relation to the master brake cylinder housing when the piston is actuated;
   (2) the sensor element is pre-tensioned in the sensor element initial position in the master brake cylinder housing by a spring arrangement and is movable with the piston from the sensor element initial position into the sensor element actuation position, deflecting the spring arrangement, and the sensor element is compressible obliquely or transversely to the movement axis; or (3) the sensor element is received in a guide body which is guided in the master brake cylinder housing, and the guide body has an abutment portion by way of which the guide body directly contacts the piston.

2. The master brake cylinder arrangement according to claim 1, wherein in either (1) or (3), the guide body is guided in the master brake cylinder housing.

3. The master brake cylinder arrangement according to claim 2, wherein the guide body has an abutment portion by way of which it may interact with the piston.

4. The master brake cylinder arrangement according to claim 1, further including in (3), a deflection lever for deflection of the sensor element as a function of the piston movement, wherein the deflection lever may be coupled to the master brake cylinder housing in articulated manner and be capable of interacting with the piston.

5. A master brake cylinder arrangement according to claim 1, wherein the sensor element is capable of deflection substantially parallel, obliquely, or substantially at a right angle to the movement axis.

6. A master brake cylinder arrangement according to claim 1, wherein the sensor element, or a guide body carrying it, has a ramped face which has the effect of moving the sensor element in relation to the master brake cylinder housing when the piston is actuated.

7. A master brake cylinder arrangement according to claim 1, wherein the sensor element is pre-tensioned in the sensor element initial position in the master brake cylinder housing by a spring arrangement and is movable with the piston from the sensor element initial position into the sensor element actuation position, deflecting the spring arrangement, and the sensor element is compressible obliquely or transversely to the movement axis.

8. A master brake cylinder arrangement according to claim 7, wherein the spring arrangement is a compression spring, a tension spring, or a deformable elastomeric body.

9. A master brake cylinder arrangement according to claim 5, wherein a spring arrangement is compressible substantially parallel to the movement axis.

10. A master brake cylinder arrangement according to claim 7, wherein the spring arrangement is already pre-tensioned in the initial position of the sensor element.

11. A master brake cylinder arrangement according to claim 1, wherein the master brake cylinder housing has a guide recess in which the guide body and/or the spring arrangement is received.

12. A master brake cylinder arrangement according to claim 1, wherein the sensor element has a magnetic body, and wherein the position detecting sensor is a Hall effect sensor.

13. A master brake cylinder arrangement according to claim 1, wherein the position detecting device outputs a position signal that characterizes the current piston position.

14. The master brake cylinder arrangement according to claim 1, wherein the sensor element is pre-tensioned in the sensor element initial position in the master brake cylinder housing by a spring arrangement that is received in a sleeve that is fixed between the piston and the master brake cylinder housing.

15. The master brake cylinder arrangement according to claim 14, wherein the guide body extends from the sleeve into the master brake cylinder housing.

16. A master brake cylinder arrangement with actuation detection for a vehicle brake system including at least one piston arrangement with a piston which is movably guided in a receiving bore in a master brake cylinder housing, wherein:
the piston, together with the receiving bore, delimits a pressure chamber which is in fluid connection with a hydraulic brake circuit and may be moved along a movement axis between a piston initial position and a piston actuation position,
a position detecting device, for detecting movement of the piston which is caused by actuation, is provided within the receiving bore,
the position detecting device has a sensor element, which is movable as a function of a piston movement, and a position detecting sensor, which is arranged fixed on the master brake cylinder housing,
the sensor element has a body of ferromagnetic material which, as seen in a section including the movement axis, is U-shaped and is coupled or couplable to the piston and whereof longitudinal limbs point towards the position detecting sensor and whereof a transverse limb extends substantially parallel to the movement axis,
there is associated with the position detecting sensor in a fixed position a magnet,
the position detecting sensor is constructed, as a function of the relative position of the longitudinal limbs in relation to the position detecting sensor and to the fixed magnet, to detect a current piston position, and
the position detecting sensor is configured to detect the current position of the sensor element.

17. A master brake cylinder arrangement with actuation detection for a vehicle brake system including at least one piston arrangement with a piston which is movably guided in a receiving bore in a master brake cylinder housing, wherein:
the piston, together with the receiving bore, delimits a pressure chamber which is in fluid connection with a hydraulic brake circuit and may be moved along a movement axis between a piston initial position and a piston actuation position,
a position detecting device, for detecting movement of the piston which is caused by actuation, is provided within the receiving bore,
the position detecting device has a sensor element, which is movable as a function of a piston movement, and a position detecting sensor, which is arranged fixed on the master brake cylinder housing, and
the sensor element is received and guided in the master brake cylinder housing independently of the piston and is capable of interacting with the piston for deflection as a function of the piston movement, wherein either:
(1) the sensor element, or a guide body carrying it, has a ramped face which has the effect of moving the sensor element in relation to the master brake cylinder housing when the piston is actuated, or
(2) the sensor element is pre-tensioned in the sensor element initial position in the master brake cylinder housing by a spring arrangement and is movable with the piston from the sensor element initial position into the sensor element actuation position, deflecting the spring arrangement, and the sensor element is compressible obliquely or transversely to the movement axis.

18. A master brake cylinder arrangement according to claim 17, wherein the sensor element, or the guide body carrying it, has a ramped face which has the effect of moving the sensor element in relation to the master brake cylinder housing when the piston is actuated.

19. A master brake cylinder arrangement according to claim 17, wherein the sensor element is pre-tensioned in the sensor element initial position in the master brake cylinder housing by a spring arrangement and is movable with the piston from the sensor element initial position into a sensor element actuation position, deflecting the spring arrangement, and the sensor element is compressible obliquely or transversely to the movement axis.

* * * * *